(12) United States Patent
Thiele et al.

(10) Patent No.: US 10,049,590 B2
(45) Date of Patent: Aug. 14, 2018

(54) METHOD FOR AUTONOMOUS CONTROLLING OF AN AERIAL VEHICLE AND CORRESPONDING SYSTEM

(71) Applicant: Airbus Defence and Space GmbH, Taufkirchen (DE)

(72) Inventors: Christian Thiele, Garching (DE); Winfried Lohmiller, Freising (DE); Lars Schoepfer, Manching (DE); Hugo Heusinger, Neuching (DE); Werner Kleih, Rosenheim (DE)

(73) Assignee: AIRBUS DEFENCE AND SPACE GMBH, Taufkirchen (DE)

( * ) Notice: Subject to any disclaimer, the term of this patent is extended or adjusted under 35 U.S.C. 154(b) by 0 days.

(21) Appl. No.: 15/023,962

(22) PCT Filed: Sep. 23, 2014

(86) PCT No.: PCT/EP2014/002568
§ 371 (c)(1),
(2) Date: Mar. 22, 2016

(87) PCT Pub. No.: WO2015/043737
PCT Pub. Date: Apr. 2, 2015

(65) Prior Publication Data
US 2016/0240091 A1 Aug. 18, 2016

(30) Foreign Application Priority Data
Sep. 26, 2013 (EP) ..................................... 13004678

(51) Int. Cl.
*G08G 5/04* (2006.01)
*B64C 39/02* (2006.01)
(Continued)

(52) U.S. Cl.
CPC ............. *G08G 5/045* (2013.01); *B64C 39/02* (2013.01); *G05D 1/042* (2013.01); *G05D 1/101* (2013.01);
(Continued)

(58) Field of Classification Search
CPC .... G08G 5/045; G08G 5/0069; G08G 5/0091; B64C 39/02; B64C 2201/141; G05D 1/042; G05D 1/104
See application file for complete search history.

(56) References Cited

U.S. PATENT DOCUMENTS

2003/0057327 A1 3/2003 Carroll
2004/0193334 A1 9/2004 Carlsson et al.
(Continued)

FOREIGN PATENT DOCUMENTS

DE 4239638 5/1994
EP 1462898 9/2004
(Continued)

OTHER PUBLICATIONS

European Search Report, dated May 7, 2014, priority document.

*Primary Examiner* — Michael D Lang
(74) *Attorney, Agent, or Firm* — Greer, Burns & Crain, Ltd.

(57) ABSTRACT

A method for autonomous controlling of an aerial vehicle, wherein a flight operator commands the aerial vehicle, comprising the steps of: measuring flight and/or system data of the aerial vehicle; performing an evaluation of a flight condition of the aerial vehicle based on the measured data and based on at least one decision criterion; and, issuing at least one autonomous controlling command, if, as a result of the evaluation of the flight condition, the aerial vehicle is in danger.

9 Claims, 2 Drawing Sheets

(51) Int. Cl.
 *G05D 1/04* (2006.01)
 *G08G 5/00* (2006.01)
 *G05D 1/10* (2006.01)
 *G08G 5/02* (2006.01)

(52) U.S. Cl.
 CPC ......... *G08G 5/0013* (2013.01); *G08G 5/0021* (2013.01); *G08G 5/0056* (2013.01); *G08G 5/0065* (2013.01); *G08G 5/0069* (2013.01); *G08G 5/025* (2013.01); *B64C 2201/141* (2013.01); *G08G 5/0091* (2013.01)

(56) References Cited

U.S. PATENT DOCUMENTS

| | | | |
|---|---|---|---|
| 2008/0147309 A1* | 6/2008 | Ivansson | G05D 1/105 |
| | | | 701/4 |
| 2012/0203450 A1 | 8/2012 | Meyer et al. | |
| 2014/0032034 A1* | 1/2014 | Raptopoulos | G08G 5/0069 |
| | | | 701/25 |
| 2014/0249738 A1* | 9/2014 | Euteneuer | G01S 13/9303 |
| | | | 701/301 |
| 2015/0153740 A1* | 6/2015 | Ben-Shachar | G05D 1/0676 |
| | | | 701/16 |

FOREIGN PATENT DOCUMENTS

| | | |
|---|---|---|
| EP | 2112065 | 10/2009 |
| WO | 2013124852 | 8/2013 |

\* cited by examiner

METHOD FOR AUTONOMOUS CONTROLLING OF AN AERIAL VEHICLE AND CORRESPONDING SYSTEM

CROSS-REFERENCES TO RELATED APPLICATIONS

This application claims the benefit of the European patent application No. 13004678.2 filed on Sep. 26, 2013, the entire disclosures of which are incorporated herein by way of reference.

BACKGROUND OF THE INVENTION

The present invention relates to a method for autonomous controlling of an aerial vehicle and to a corresponding system.

US 2012/0203450 A1 describes an unmanned aircraft, unmanned aviation system and method for collision avoidance during the flight operation of an unmanned aircraft. The unmanned aircraft, as described there, includes a lift and propulsion system and a flight control system having a flight control unit, a navigation system and an actuator system. The flight control unit has an autopilot unit. The flight control unit, as described there, calculates control commands using data from the navigation system and/or the autopilot unit, which can be conveyed to the actuator system for actuating the lift and propulsion system. A connection between the collision warning system and the autopilot unit is provided, in order to initiate an obstacle avoidance maneuver by the autopilot unit with the help of the collision avoidance data.

In manned aviation, the flight operator, FO, or the pilot in command, PIC, receives a warning or caution based on which he decides what to do, e.g., also on experience and/or the flight manual. Appropriate reactions on failure conditions depend on the situational awareness of the flight operator and are subject to human decisions. Existing unmanned aerial systems, UAS, simply follow their flight plan based on automated predefined processes which do not consider the current state of the aerial vehicle.

SUMMARY OF THE INVENTION

There may be a need to provide improved controlling methods for aerial vehicles. An object of the invention is to provide a method for autonomous controlling of an aerial vehicle and to provide a system for conducting this method.

These objects are achieved by a method for autonomous controlling of an aerial vehicle and a system for conducting this method according to the independent claims. In detail, a method for autonomous controlling of an aerial vehicle is provided, wherein a flight operator commands the aerial vehicle, comprising the steps of: measuring flight and/or system data of the aerial vehicle; performing an evaluation of a flight condition of the aerial vehicle based on the measured data and based on at least one decision criterion; and issuing at least one autonomous controlling command, if, as a result of the evaluation of the flight condition, the aerial vehicle safety of flight is in danger.

Moreover, a system for conducting this method is provided comprising: a data sensing unit, which is designed to measure flight and/or system data of the aerial vehicle; an evaluation unit, which is designed to evaluate the flight or system condition of the aerial vehicle based on the measured data and based on at least one decision criterion; and a command unit, which is designed to issue at least one autonomous controlling command if as a result of the evaluation the aerial vehicle's safety of flight is in danger.

The basic idea of the invention may be seen in that a defined proceeding is provided for multiple failures, failure propagation and degradation of the air vehicle health over flight time. The aim of the method for autonomous controlling of an aerial vehicle is to provide, in any case, a predictable behavior in accordance with regulations with the appropriate level of safety.

A benefit of the invention is given by the fact that the flight operator is in command of the aerial vehicle whenever the aerial vehicle flight condition is in safe operation and no danger is present according to an evaluation of the flight situation. Advantageously an advanced autonomous system capable of eliminating the need for onboard human piloting is provided.

In danger threatening flight conditions, there is not only just a warning to the flight operator, but also an autonomous reaction of the autonomous controlling system, e.g., in situations which impact safety in an immediate manner, whereas the flight operator has an override capability.

A further benefit is given by the fact that means to safely cope with emergency and controlled crash scenarios are provided by the method. The situational awareness on the system status and health is provided for proper decision taking. The autonomous behavior of the system in danger or failure situations remains predictable for the flight operator, for the air traffic management, and for third parties.

Additional failures or external events are taken into consideration to maximize the safety of the aircraft or the safety of third parties. The method is applicable for single piloted aircraft if the single pilot is physically not able to fly the aircraft anymore and allows for reducing and/or taking over parts of the pilot's workload.

According to an exemplary embodiment of the invention, the performing of the evaluation of the flight condition of the aerial vehicle comprises a sense and avoid concept and the least one autonomous controlling command issued comprises a sense and avoid maneuver for the aerial vehicle.

According to a further exemplary embodiment of the invention, the evaluation of the flight condition of the aerial vehicle is performed by means of a traffic alert and collision avoidance system of the aerial vehicle. This allows significant operational benefits in terms of airspace and aircraft control.

According to a further exemplary embodiment of the invention, the at least one autonomous controlling command issued comprises an automatic take-off of the aerial vehicle. This advantageously provides safe take-offs.

According to a further exemplary embodiment of the invention, the at least one autonomous controlling command issued comprises an automatic landing of the aerial vehicle. Thereby, safe automatic landing is provided.

According to a further exemplary embodiment of the invention, the at least one autonomous controlling command issued comprises an emergency route command and/or a crash route command and/or an alternate route command and/or an approach and landing route command and/or go around procedures and/or vertical change in elevation. This allows in an advantageous manner adaption of the flight plan.

According to a further exemplary embodiment of the invention, the at least one autonomous controlling command is checked by an air vehicle ground segment and/or the flight operator before it is released to the air segment. This allows improved predictability of the actual flight path.

According to a further exemplary embodiment of the invention, data regarding altitude, airspeed, ground speed or flight path of the aerial vehicle or further parameters of the aerial vehicle or weather conditions parameters, like air temperature or wind speed, is used as the flight data of the aerial vehicle and wherein health information of engines, flight control computer or further units of the aerial vehicle is used as the system data of the aerial vehicle.

According to a further exemplary embodiment of the invention, a minimum safe altitude, a maximum safe altitude a minimum safe airspeed or a maximum safe airspeed of the aerial vehicle is used as the at least one decision criterion.

Advantageous further developments and embodiments of the present invention are subject of the dependent claims. It has to be noted that embodiments of the invention are described with reference to different subject-matters. In particular, some embodiments are described with reference to apparatus type claims, whereas other embodiments are described with reference to method type claims.

However, a person skilled in the art will gather from the above and the following description that, unless other notified, in addition to any combination of features belonging to one type of subject-matter also any combination between features relating to different subject-matters is considered to be disclosed with this application.

The aspects defined above and further aspects, features and advantages of the invention may also be derived from the examples of embodiments to be described hereinafter and are explained with reference to examples of embodiments. The invention will be described in more detail hereinafter with reference to examples of embodiments but to which the invention is not limited.

BRIEF DESCRIPTION OF THE DRAWINGS

A more complete appreciation of the invention and the attendant advantages thereof will be more clearly understood by reference to the following schematic drawings, which are not to scale, wherein.

DETAILED DESCRIPTION OF THE PREFERRED EMBODIMENTS

Figure 2:
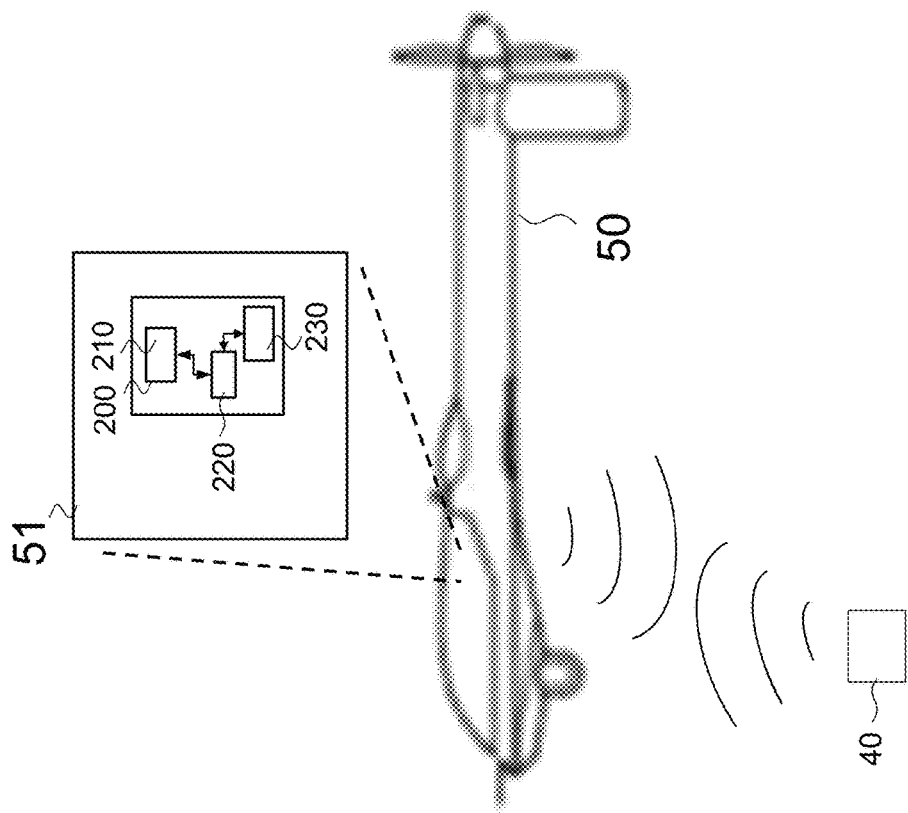
FIG. 2 shows a system for autonomous controlling of an aerial vehicle according to a further exemplary embodiment of the invention.

The illustration in the drawings is schematic only. It is noted that in different figures, similar or identical elements or steps are provided with the same reference signs.

The system data of an aerial vehicle 50 may comprise system data of the data link and of the ground segment. The wording "wherein a flight operator commands the aerial vehicle 50" as used herein means that the commanding of the aerial vehicle 50 may be performed by one or two or even more flight operators in general. However, the invention may also be performed, if, for any reason, temporarily, for short, i.e., several minutes, or long times, i.e., the whole flight or several hours, none of the flight operators is available or not the foreseen number of flight operators is available.

The terms crash route 23 or crash site 15 do not necessarily mean that the aerial vehicle 50 is damaged upon landing. A crash site 15 could be any suitable ground surface, e. g. an empty parking area or an empty area of arable land.

Figure 1:
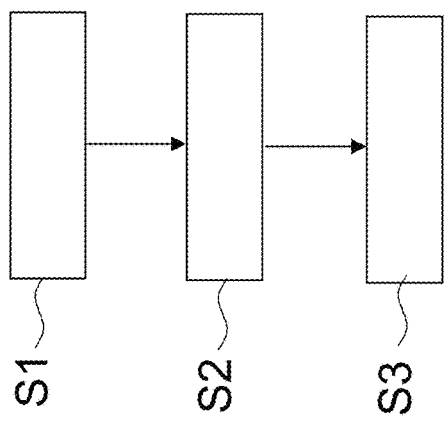
FIG. 1 shows a flow diagram of a method for autonomous controlling of an aerial vehicle according to an exemplary embodiment of the invention.

FIG. 1 shows a flow diagram of a method for autonomous controlling of an aerial vehicle 50 according to an exemplary of the invention. The method for autonomous controlling of the aerial vehicle 50, wherein a flight operator, FO, commands the aerial vehicle 50, comprises the steps of measuring S1 flight and/or data of the aerial vehicle, performing S2 an evaluation of a flight condition of the aerial vehicle 50 based on the measured flight and/or system data and based on at least one decision criterion, and issuing S3 at least one autonomous controlling command, if, as a result of the evaluation of the flight condition, the aerial vehicle 50 is in danger.

The flow diagram architecture of the method is shown in FIG. 1. It is comprised of several blocks, called steps or tasks, which are allotted throughout different functioning layers such as the application level, the low level control, the data processing level, and the hardware level.

It is to be understood that the sequence of the steps outlined above is merely exemplary. The invention applies to unmanned aerial vehicles 50, UAVs, but also can be applied to single piloted manned aircraft if the single pilot is physically not able anymore to fly the aircraft and autonomous safe flight is needed or simply to reduce the work load for the single pilot.

For the case of manned aircraft, everything is applicable except the controlled crash, i.e., a controlled landing on any suitable ground, not necessarily implying damage to the aerial vehicle 50. The following general principle is applicable for typical UAVs: The flight operator is in command of the aerial vehicle 50, AV, whenever the command and control, C&C, chain between the aerial vehicle 50 and the aerial vehicle ground segment is healthy. However, autonomous reactions are implemented and performed for situations which impact safety in an immediate manner, e.g., vertical or horizontal Sense and Avoid, S&A, maneuver, whereas the flight operator has an override capability, e.g., by switching off a traffic collision avoidance system, TCAS, as setting in advance or by a dedicated override button, as an exception to the principle of human control.

Further, autonomous reactions can be implemented and performed for situations which impact safety in an immediate manner, e.g., vertical deviations due to failure conditions or special external events, whereas the flight operator has an override capability as an exception of human control. For example, an autonomous go-around, which is an aborted landing of the aerial vehicle 50 that is on final approach, whereas the flight operator has an override capability by a dedicated override button which is connected to the system 200, e.g., by a data link.

The on-board system 200 is equipped with a microcontroller, sensors and actuators, and communication devices that allow full functionality for autonomous control.

The pilot-in-command or flight operator of the aerial vehicle 50 shall have final authority as to the disposition of the aircraft while in command. When a command is issued by the flight operator, the command will be checked by the aerial vehicle ground segment and aerial vehicle 50.

In automatic mode, the aerial vehicle 50 may be guided through space and time by means of a flight plan, FP. In this mode, the aerial vehicle 50 attitude, speed and flight path 101 might be fully controlled by the system 200. No input from the flight operator is needed other than to load or modify the required flight plan.

When the flight plan is uploaded into the aerial vehicle 50, a check against the data stored in an aeronautical database is performed. This check ensures that the flight plan is safe by verifying that runway coordinates are correct, that the flight plan altitudes are higher than the minimum safe altitudes, MSA, that the approach path of the flight plan is correct; compared to the corresponding data stored in the database. Furthermore, the transmission of data through the relevant interfaces is protected by means of a cyclic redundancy check, CRC. Parts of these checks could also be implemented on the ground in the aerial vehicle ground segment 40.

In semi-automatic mode under nominal, i.e., failure-free conditions, the aerial vehicle 50 is guided by the commands of the flight operator. With this type of control, the flight operator commands outer loop parameters such as altitude, heading and air speed of the aerial vehicle 50 and determines the flight path 101 of the aerial vehicle 50. The aerial vehicle management system, AVMS, may be installed in the aerial vehicle 50 and operates the aerial vehicle controls to achieve the commanded outer loop parameter values.

The flight plan may contain all phases of the flight from initial taxiway, e.g., a path in an airport connecting runways and airfields with ramps, hangars, terminals and other facilities, to a final stop of the flight. A valid flight plan might be available in the control system 200 of the aerial vehicle 50 at any time after initial loading.

The flight operator has the responsibility to assure that the aerial vehicle 50 is following the flight plan in automatic mode. If unintended deviations are detected by the flight operator, he performs corrective actions in a semiautomatic mode.

FIG. 2 shows a system 200 for autonomous controlling of an aerial vehicle according to a further exemplary embodiment of the invention. The system 200 may comprise a data sensing unit 210, an evaluation unit 220, and a command unit 230.

The data sensing unit 210 might be designed to measure flight and/or system data of the aerial vehicle. The data sensing unit 210 might be a camera system, an airspeed sensor, a ground speed sensor, a space-based satellite navigation system that provides location and time information, or an aircraft collision avoidance system.

The data sensing unit 210 may use the state and health information of all aircraft (and ground segment) systems as e.g., engines, flight control computers, navigation, actuators, landing gear or further units of the aerial vehicle 50. The system data covers the health state of these systems, covering the information on system failures, e.g., first engine failure, second engine failure, and further units of the aerial vehicle 50.

The data sensing unit 210 might be further include angular rate sensors for all three axes, accelerometers along all three axes, a three-axis magnetic compass, radar sensors, infrared sensors and absolute and differential pressure sensors.

The evaluation unit 220 might be designed to evaluate the flight or system condition of the aerial vehicle 50 based on the measured data and based on at least one decision criterion. The evaluation unit 220 and/or the command unit 230 might be a programmable logic controller.

For example, the command unit 230 is designed to issue at least one autonomous controlling command if as a result of the evaluation the aerial vehicle is in danger.

A flight control system 51 may comprise connecting linkages, and the necessary operating mechanisms to control an aircraft's direction in flight. The flight control system 51 might comprise the system for autonomous controlling of the aerial vehicle 50.

The aerial vehicle 50 may further be controlled by an air vehicle ground segment 40. The air vehicle ground segment 40 may comprise a mission control element, MCE, and a Launch and recovery element, LRE.

Figure 3:
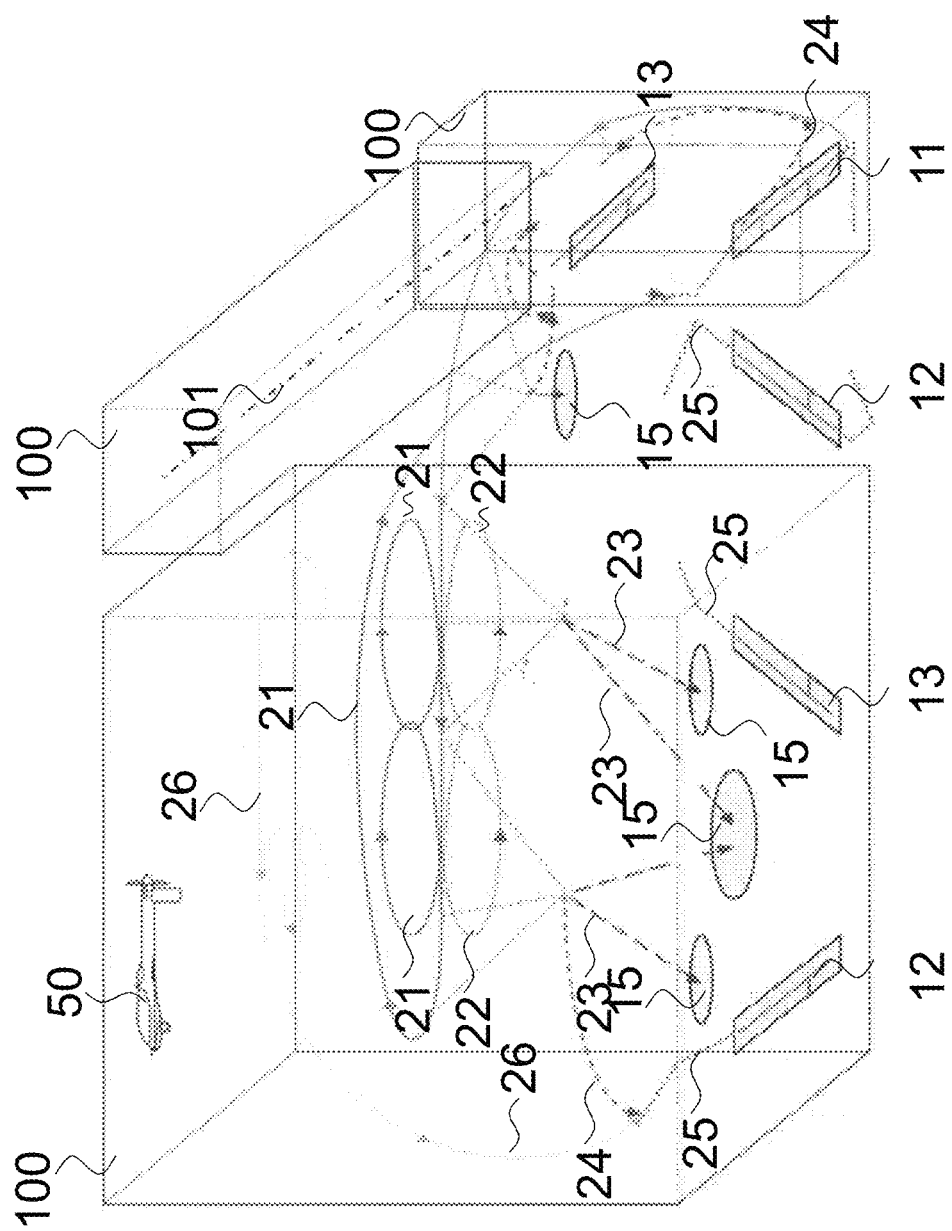
FIG. 3 shows an airspace through which the aerial vehicle is flying for explaining the invention.

FIG. 3 shows an airspace 100 through which the aerial vehicle 50 is flying for explaining the invention. FIG. 3 illustrates an aerial vehicle 50, particularly an UAS, which is flown through a mission computer which is loaded with a mission plan before each flight.

The flight plan contains at least one nominal route 21, which corresponds to a route prepared regarding the air tasking orders, ATO, and/or airspace coordination orders, ACO, from the initial taxi start to final end including taxi and alternate taxi routes. Nominal routes 21 might be part of the flight plan, FP, in the air segment and ground segment. As an active route, any type of route might be selected and might be used as the route currently followed by the aerial vehicle 50.

The flight plan for the aerial vehicle 50 includes the following further types of routes, also routes to landing sites, to be used if the nominal flight plan containing the at least one nominal route 21 is no longer feasible: alternate routes 22, approach and landing sub-routes 25, command & control, C&C, loss routes 26, emergency routes 24, or crash routes 23. A C&C loss may refer to a loss of a C&C chain including communication link between the aerial vehicle 50 and the ground segment 40 (FIG. 2).

Alternative routes 22 are routes requested by flight operator and are prepared regarding the changed air tasking orders, ATO, e. g. changed mission objectives, or regarding changed airspace coordination orders, ACO. Alternate routes 22 might be only part of the mission planning in the ground segment.

Approach and landing sub-routes 25 are sub-routes normally followed from initial approach fix, IAF, to stop point for each runway of the nominal airfield 11 and alternate airfields 12. The approach and landing sub-routes 25 may include corresponding go around procedures.

A command & control loss route 26 may be defined as a route used by the aerial vehicle 50 autonomously or if selected by the flight operator in case of a complete loss of the green system command & control chain. The command & control loss route 26 might end at the nominal airfield 11 or at the alternate airfield 12.

An emergency route 24 might be defined as a route used autonomously or, if selected by the flight operator, that permits the aerial vehicle 50 to land as soon as possible in case of problems with the air segment.

A crash sub-route 23 might be defined as a sub-route that permits the aerial vehicle 50 to go to the next reachable crash site 15. This is only applicable to UAVs to perform a controlled crash.

The flight plan may include the following types of landing sites connected to the routes above: a nominal airfield 11 and/or an alternate airfield 12. A nominal airfield 11 might be defined as an airfield from where the air segment, AS, is under nominal conditions operated regarding automatic take-off and landing, ATOL, phases for departure and/or arrival. The nominal airfield 11 can be located on the national territory or a deployment platform.

An alternate airfield 12 may be defined as an airfield used on flight operator request if cleared by the air traffic control, and/or when it is impossible to land on the nominal airfield 11 for destination because of a failure of the nominal airfield 11, whereby the air segment is healthy. A ground landing system might be available at the alternate airfield 12. The alternate airfield might further be an aerodrome at which an aircraft would be able to land after experiencing an abnormal or emergency condition while en route.

An emergency airfield 13 might be defined as an airfield used if the air segment has a malfunction and the aerial vehicle 50 is required to land as soon as possible without being able to reach the nominal airfield 11 and/or the alternate airfield 12. The emergency airfield 13 might not be equipped with a ground landing system and the emergency airfield 13 can be designed and constructed for other purposes.

A crash site 15 might be defined as a ground location used for a controlled crash of the air segment when no landing site is reachable for the aerial vehicle 50 in these areas, casualties on ground can be avoided. A crash of the aerial vehicle 50 inside the crash sites is performed if failures occur that prevent the flight control system from maintaining the aerial vehicle 50 in a controllable and maneuverable until the impact of the aerial vehicle 50 on the ground.

A flight plan of the aerial vehicle 50 shall comprise information regarding such of the following items as are considered relevant by the appropriate air traffic control authority: Aircraft identification of the aerial vehicle 50, flight rules and type of flight, number and types of aircraft and wake turbulence category, equipment, departure aerodrome, estimated off-block time, cruising speeds, cruising levels, route to be followed by the aerial vehicle 50, destination aerodrome and total estimated elapsed mission time, alternate aerodromes, fuel endurance, total number of persons on board of the aerial vehicle 50, emergency and survival equipment and further information.

As an autonomous reaction, i.e., as the at least one autonomous controlling command, the aerial vehicle 50 may select which of the flight paths 101 preplanned in the flight plan is selected and flown. Deviations from the flight plan due to failure conditions or special external events might be restricted to only vertical, e.g., altitude level, and not horizontal due to predictability. They are autonomously recovered by the aerial vehicle 50. Deviations of the aerial vehicle 50 due to S&A maneuvers for collision avoidance might be also horizontal or lateral.

The flight operator can modify the planned flight by means of uploading a modified flight plan or by issuing a direct command. A special transponder code for this failure is recommended. Modifying the flight plan is agreed at a global level by International Civil Aviation Organization.

Principally there are two ways to activate a C&C loss or emergency/crash route: first option, an autonomous activation by the aerial vehicle 50 is performed, based on position and air segment, AS, status and health data using the flight plan. A second option is given by a manual activation by the flight operator by dedicated commands by a dedicated direct command "new active route" to activate the nominal route 21 or alternate route 22 or C&C loss route 26 or emergency route 24 or crash route 23.

Nevertheless, the pilot-in-command, PIC, can manually fly the aircraft at any time, whether in response to air traffic control, ATC, instructions or to accommodate ad-hoc tasking or for any reason. Whichever mode is being flown, however, the UAS remains extremely predicable.

The introduction of the crash function, which is fully automatic and only uses a minimum set of systems and functions that are needed to perform a controlled crash (sensor to actuation chain plus electrical and hydraulic (emergency) power supply, is only used for unmanned vehicles. For manned vehicles this crash function is either removed or replaced by an emergency landing function outside an airport area, e.g., in a plane field. All flight trajectories (semi-automatic or automatic) will be defined by the flight operator in such a way that a cleared area crash, e.g., the crash sites 15, or landing site is reachable unless a deviation is essential for mission execution.

All flight trajectories (semi-automatic or automatic) will be defined by the flight operator in such a way that an unpopulated or cleared area crash site, where fatalities can be reasonably expected not to occur, can always be reached from the termination space with the following characteristics: a minimal gliding cone altitude to the unpopulated or cleared area crash sites, where the wind shift is only considered for large wind, a cylindrical distance limitation to the crash site, and the terrain surface will be considered by the flight operator.

Deviations from this procedure are only allowed when it is operational essential. For low altitude flight trajectories (including take-off and landing) no crash sites need to be defined. Instead the flight operator will ensure that the duration of low level flights is kept as short as possible for the intended mission.

The controlled crash function is activated autonomously (under C&C loss) if landing sites cannot be reached safely anymore, e.g., due to: double engine failure, backup battery is the last remaining electrical power source, critical double fuel failure, such that landing site is no longer in range, primary and secondary environmental control system, ECS, is lost or further issues.

While the invention has been illustrated and described in detail in the drawings and foregoing description, such illustration and description are to be considered illustrative or exemplary and not restrictive; the invention is not limited to the disclosed embodiment.

Other variations to the disclosed embodiment can be understood and effected by those skilled in the art and practicing the claimed invention, from a study of the drawings, the disclosure, and the appended claims. In the claims, the word "comprising" does not exclude other elements or steps, and the indefinite article "a" or "an" does not exclude a plurality. Any reference signs in the claims should not be construed as limiting the scope.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:
1. A method for autonomous controlling of an aerial vehicle, wherein a flight operator commands the aerial vehicle, comprising the steps of:
   measuring data of the aerial vehicle including at least flight data of the aerial vehicle;

performing an evaluation of a flight condition of the aerial vehicle based on the measured data and based on at least one decision criterion; and, issuing at least one autonomous controlling command, if, as a result of the evaluation of the flight condition, the aerial vehicle is in danger;

wherein the at least one autonomous controlling command issued comprises at least one of:

an emergency route command that selects an emergency route, wherein the emergency route permits the aerial vehicle to land as soon as possible;

a crash route command that selects a crash route, wherein the crash route permits the aerial vehicle to go to a next reachable crash site;

an alternate route command that selects an alternate route, wherein the alternative route is prepared regarding changed air tasking orders, changed mission objectives or changed airspace coordination orders; or an approach and landing route command that selects an approach and landing route;

wherein the evaluation of the flight condition of the aerial vehicle is performed via a traffic alert and collision avoidance system of the aerial vehicle;

wherein the measured data of the aerial vehicle includes flight data of the aerial vehicle and system data of the aerial vehicle, and wherein data regarding at least one of:
  altitude,
  airspeed,
  ground speed,
  flight path of the aerial vehicle,
  weather conditions parameters,
  air temperature, or
  wind speed,
is used as the flight data of the aerial vehicle for said performing an evaluation of a flight condition of the aerial vehicle;

and wherein at least one of:
  health information of engines,
  health information of a flight control computer, or
  health information of further units of the aerial vehicle,
is used as the system data of the aerial vehicle for said performing an evaluation of a flight condition of the aerial vehicle.

2. The method according to claim 1, wherein the at least one autonomous controlling command is checked by at least one of an air vehicle ground segment or the flight operator, before it is released to the air segment.

3. The method according to claim 1, wherein at least one of:
  a minimum safe altitude,
  a maximum safe altitude,
  a minimum safe airspeed, or
  a maximum safe airspeed of the aerial vehicle,
is used as the at least one decision criterion.

4. The method of claim 1, wherein the emergency route, the crash route, the alternate route, and the approach and landing are preplanned in a flight plan for the aerial vehicle.

5. The method of claim 1, wherein the autonomous controlling command comprises an alternate route command that selects an alternate route, wherein the alternative route is prepared regarding changed air tasking orders, changed mission objectives or changed airspace coordination orders.

6. A system for autonomous controlling of an aerial vehicle, comprising:

a data sensing unit configured to measure data of the aerial vehicle including at least flight data of the aerial vehicle;

an evaluation unit configured to evaluate a flight or a system condition of the aerial vehicle based on the measured data and based on at least one decision criterion; and a command unit configured to issue at least one autonomous controlling command if as a result of the evaluation the aerial vehicle is in danger;

wherein the evaluation unit evaluates the flight condition of the aerial vehicle via a traffic alert and collision avoidance system of the aerial vehicle;

wherein the measured data of the aerial vehicle includes flight data of the aerial vehicle and system data of the aerial vehicle, wherein data regarding at least one of:
  altitude,
  airspeed,
  ground speed,
  flight path of the aerial vehicle,
  weather conditions parameters,
  air temperature, or
  wind speed,
is used as the flight data of the aerial vehicle for said performing an evaluation of a flight condition of the aerial vehicle;

and wherein at least one of:
  health information of engines,
  health information of a flight control computer, or
  health information of further units of the aerial vehicle,
is used as the system data of the aerial vehicle for said performing an evaluation of a flight condition of the aerial vehicle;

wherein the at least one autonomous controlling command issued comprises at least one of:

an emergency route command that selects an emergency route;

a crash route command that selects a crash route;

an alternate route command that selects an alternate route; or an approach and landing route command that selects an approach and landing route;

wherein the emergency route, the crash route, the alternate route, and the approach and landing route are preplanned in a flight plan for the aerial vehicle.

7. The system of claim 6, wherein the autonomous controlling command comprises an alternate route command that selects an alternate route, wherein the alternative route is prepared regarding changed air tasking orders, changed mission objectives or changed airspace coordination orders.

8. A method for autonomous controlling of an aerial vehicle, wherein a flight operator commands the aerial vehicle, comprising the steps of:

measuring at least one of flight or system data of the aerial vehicle;

performing an evaluation of a flight condition of the aerial vehicle based on the measured data and based on at least one decision criterion; and, issuing at least one autonomous controlling command, if, as a result of the evaluation of the flight condition, the aerial vehicle is in danger;

wherein the measured data of the aerial vehicle includes flight data of the aerial vehicle and system data of the aerial vehicle, wherein data regarding at least one of:
  altitude,
  airspeed,
  ground speed,
  flight path of the aerial vehicle,
  weather conditions parameters,
  air temperature, or
  wind speed, is used as the flight data of the aerial vehicle for said performing an evaluation of a flight condition of the aerial vehicle;
and wherein at least one of:
  health information of engines,
  health information of a flight control computer, or
  health information of further units of the aerial vehicle,
is used as the system data of the aerial vehicle for said performing an evaluation of a flight condition of the aerial vehicle;
wherein the at least one autonomous controlling command comprises at least one of:
  an automatic take-off of the aerial vehicle; or
  an automatic landing of the aerial vehicle;
wherein the at least one autonomous controlling command is preplanned in a flight plan for the aerial vehicle.

9. The method of claim 8, wherein the at least one autonomous controlling command comprises an automatic take-off of the aerial vehicle.

* * * * *